No. 746,961. Patented December 15, 1903.

UNITED STATES PATENT OFFICE.

AUGUST J. HEINE, OF WAHPETON, NORTH DAKOTA, ASSIGNOR TO HEINE MANUFACTURING COMPANY, OF WAHPETON, NORTH DAKOTA, A CORPORATION OF NORTH DAKOTA.

BAND-CUTTER AND FEEDER.

SPECIFICATION forming part of Letters Patent No. 746,961, dated December 15, 1903.

Application filed March 19, 1900. Renewed June 1, 1903. Serial No. 159,627. (No model.)

*To all whom it may concern:*

Be it known that I, AUGUST J. HEINE, of Wahpeton, county of Richland, State of North Dakota, have invented certain new and useful Improvements in Band-Cutters and Feeders, of which the following is a specification.

My invention relates to band-cutters and feeders for threshing-machines.

The object of the invention is to simplify and improve the retarding mechanism shown and described in Letters Patent of the United States granted to me May 2, 1899, No. 624,023.

A further object is to provide means for advancing toward the cylinder any loose bunches or bundles of grain delivered by the carrier.

The invention consists generally in various constructions and combinations, all as hereinafter described, and particularly pointed out in the claims.

Figure 1:
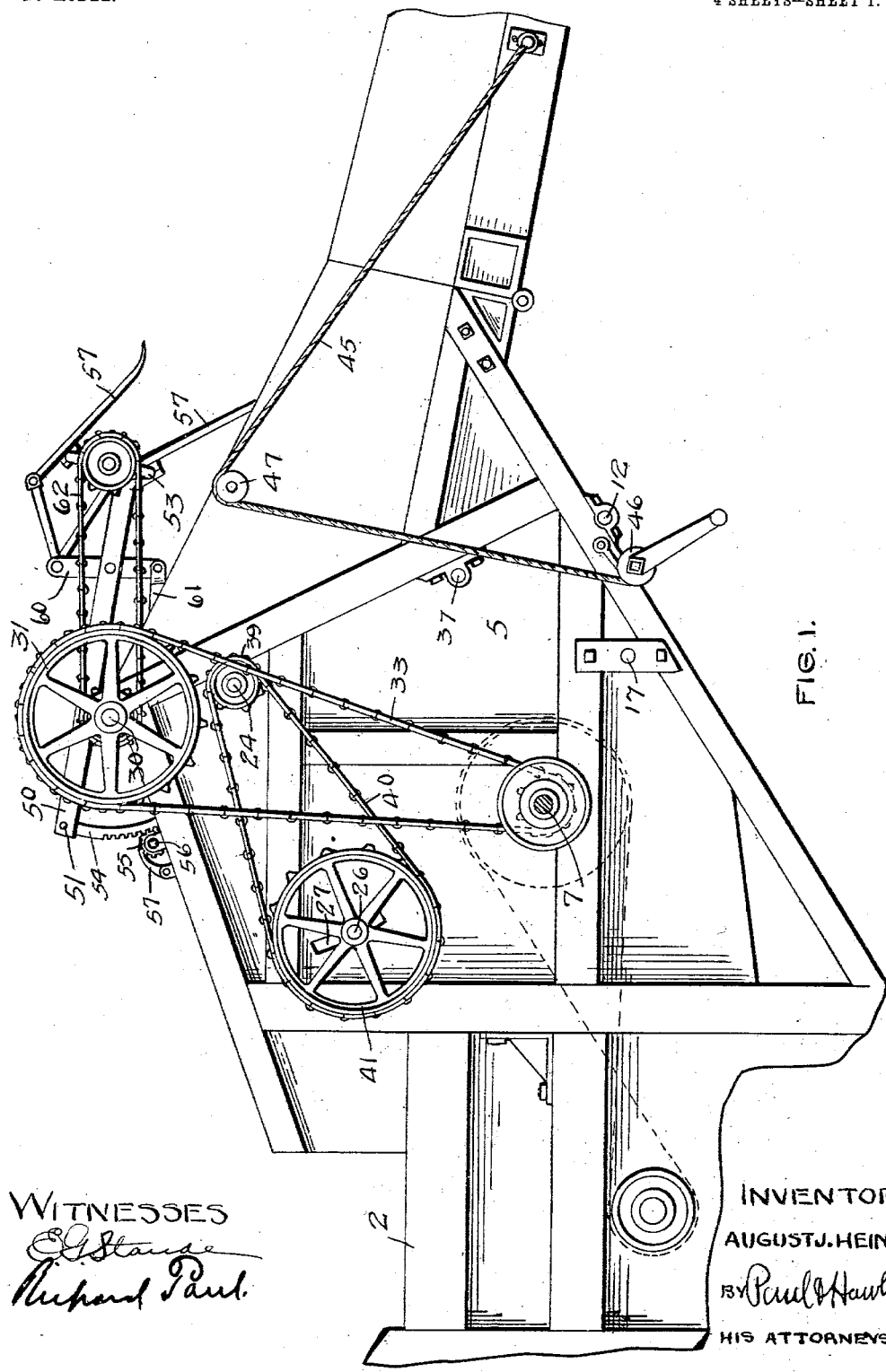
Figure 2:
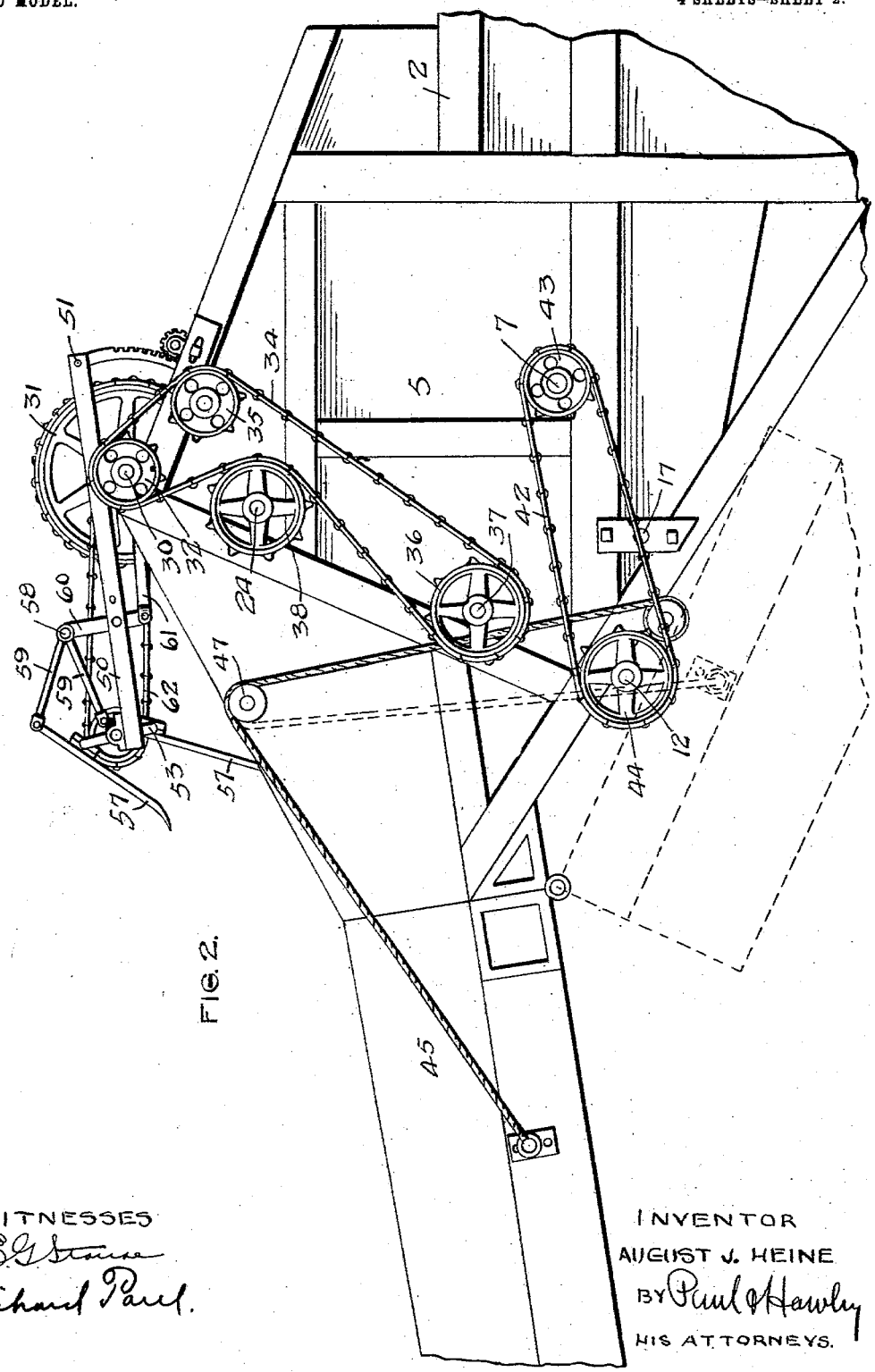
Figure 3:
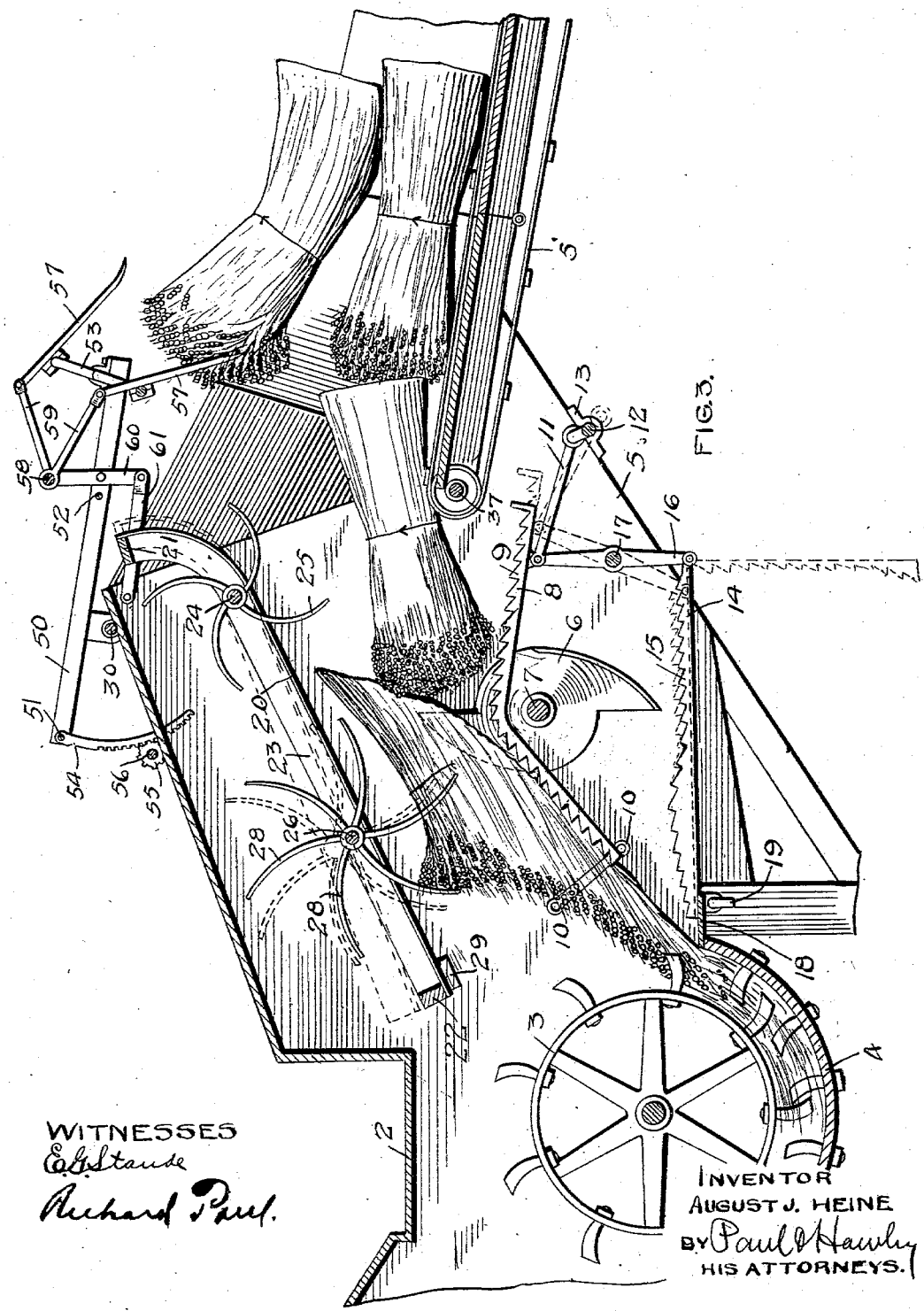
Figure 4:
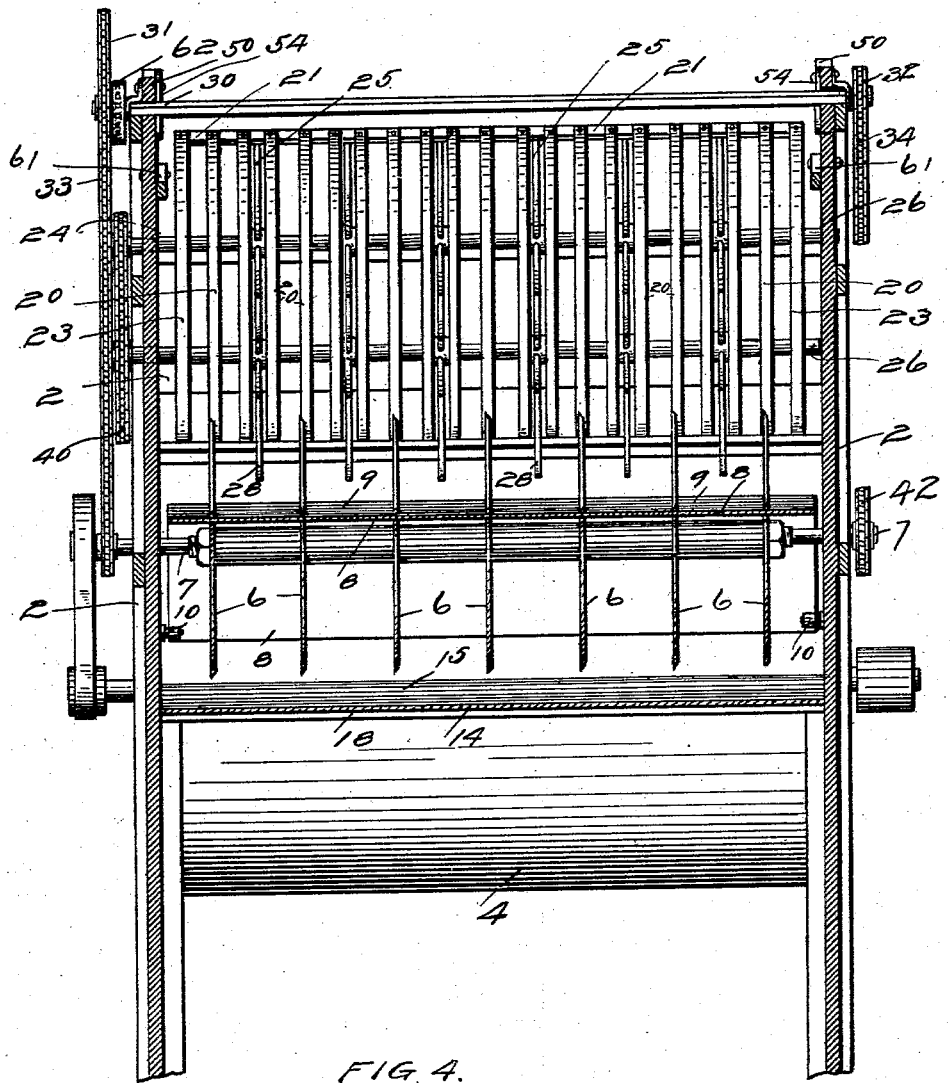

In the accompanying drawings, forming part of this specification, Figure 1 is a side elevation of the forward end of a separator with my invention attached thereto. Fig. 2 is a similar view of the opposite side of the separator. Fig. 3 is a sectional view showing the feed mechanism. Fig. 4 is a vertical section on the line $x\ x$ of Fig. 3.

In the drawings, 2 represents the frame of the separator, 3 the cylinder mounted therein, and 4 the cylinder-concave.

5 represents the body or frame of the band-cutter and feeder, and 5' the carrier adapted to deliver bundles of grain to the feed mechanism. The feed mechanism is interposed within the frame 5 between the carrier and the cylinder, and, as fully set forth in my patent above referred to, said feed mechanism is adapted to cut the bands on the bundle, loosen and spread the grain, and feed the lower portion of each bundle in a thin stream toward the cylinder, while the upper portion of the bundle is retarded or held back by suitable devices until the lower portion has passed into the cylinder, when it becomes disengaged from the retarding device and falls or slides down into the cylinder also.

The feed mechanism consists of a series of knives 6, mounted at intervals upon the shaft 7, extending across the machine. These knives preferably have two blades, as shown; but a greater or less number may be employed, if preferred.

8 represents a plate provided with a series of teeth or serrations 9 and arranged above the shaft 7 and having longitudinal slots through which the blades of the knives 6 extend, said plate preventing the grain from winding around the shaft 7 and clogging the knives. The plate 8 is preferably arched over the shaft 7, as shown, and its inner end is pivotally supported on the links 10, and its outer end is pivotally connected by links 11 with a crank-shaft 12, mounted in bearings 13 on the frame 5. When the crank-shaft is operated, a longitudinal reciprocating movement will be imparted to the plate 8, and any loose stalks or spears of grain that may fall thereon from the carrier will be advanced over or between the knives toward the cylinder. This reciprocating feature of the plate 8 is particularly advantageous when the operator desires to feed a quantity of loose grain to the cylinder, which unless advanced by the reciprocating movement of the plate would be apt to lodge thereon and clog up the feed mechanism. Beneath the revolving knives is a substantially horizontal flat plate 14, having a series of teeth or corrugations 15, arranged transversely thereof and increasing in height preferably from the outer toward the inner end of the plate. The outer end of said plate 14 is pivotally supported on swinging levers 16, mounted on a shaft 17, and the upper ends of said levers are pivotally connected to the plate 8, so that the movement of the crank 12 will operate said plates simultaneously but in opposite directions, drawing one out as the other is shoved in. The inner end of the corrugated plate 14 is supported on a feed-board 18, that is in turn supported by pins 19 in the frame of the separator in front of the cylinder. By removing the pins 19 the feed-board 18 may be withdrawn and the plate 14 dropped down to the position indicated by dotted lines to permit access to the cylinder. The plate 14 receives all the kernels of grain that fall through the plate 8 as the bundles pass through the feed mechanism, and the reciprocating movement of said plate 14 advances the kernels falling thereon toward and into the cylinder.

As the bundles of grain are delivered by the carrier upon the plate 8 they will be engaged by the revolving knives, the bands cut, and the grain advanced toward the cylinder. In place of the retarding device shown in my former patent I prefer to provide a mechanism accomplishing the same result, but much more simple in construction, and consequently less expensive to manufacture and keep in repair. In this connection I may state that it is important to have all feed devices that are arranged in front of the cylinder as simple as possible in construction, dispensing with chains and other devices composed of small parts, such as links or pins, which are liable to become broken or loosened and carried into the cylinder, causing frequently great damage thereto. With these objections in view I prefer to provide a retarding device comprising a frame or shoe consisting, preferably, of a series of slats 20, arranged at intervals on cross-bars 21 and 22, the outer ends of said slats being turned up, as shown, to present a rounded surface and prevent the bundles of grain from lodging thereon. The sides of the shoe are formed by slats 23, arranged on edge and secured at their ends to the bars 21 and 22. The shoe is pivotally supported near its outer end upon a shaft 24, whereon are arranged at intervals between the slats 20 a series of revolving pickers 25, adapted to engage the bundles of grain and advance them into position to be engaged by the knives. These pickers are located a sufficient distance above the discharge end of the carrier to permit bundles that are delivered flatwise to pass through to the band-cutters without being engaged by the pickers. If, however, any of the bundles should be tipped up on end as they pass over the discharge end of the carrier, they will be engaged and leveled by the picker-wheels, so that all of the bundles will be delivered to the cutters in a substantially horizontal position. The inner end of the shoe is supported upon a shaft 26, that passes through the sides 23 and has one end projecting through a slot 27 in the side of the feeder-frame. A series of pickers 28 are provided at intervals on the shaft 26 between the slats 20 and corresponding to the pickers 25, above described, except that they are preferably larger and driven at a slower speed. The pickers 26 engage the tops of the bundles, and as the pickers are revolved slower than the knives 6 it follows that the tops of the bundles will be held back or retarded while the lower portions thereof are driven forward into the cylinder by the revolving knives. The grain is prevented from being carried up around the shaft 26 by the slats of the frame or shoe, and the shoe having a vertical movement on its pivot can, as indicated by dotted lines, move upwardly and accommodate itself to the quantity of grain passing over the feed mechanism. Stops 29, provided on the sides of the separator, limit the downward movement of the shoe. On the top of the feeder-frame I provide a shaft 30, having at one end a large sprocket 31 and at its opposite end a small sprocket 32. A chain 33 connects the sprocket 30 with a small sprocket on the shaft 7, whereby the knives are rapidly revolved. A chain 34 passes over the small sprocket 32 and an idler 35 to the sprocket 36 on the carrier-shaft 37, and said chain also drives a sprocket 38 on the shaft 24. The opposite end of the shaft 24 is provided with a small sprocket 39, from which a chain 40 passes to a large sprocket 41 on the shaft 26. The pickers at the outer end of the shoe are therefore driven much faster than those over the knives near the inner end of the shoe. The crank 12 is driven from the shaft 7 by a chain 42, passing over sprockets 43 and 44, provided on said shafts, respectively.

As shown in Figs. 1 and 2, I prefer to hinge the carrier-frame and support it upon a cable 45, connected at one end to the carrier-frame and at the other to a windlass 46. At an intermediate point the cable passes over the pulley 47 on the feeder-frame. By means of this windlass and rope the operator can support the carrier in position to advance the grain to the feed mechanism or allow the carrier to drop down and swing back under the feeder-frame, as indicated by dotted lines in Fig. 2.

I prefer to provide a feed-limiting mechanism above the conveyer and in front of the retarding device, said limiting mechanism permitting a single bundle or layer of bundles on the carrier to pass freely into the machine, but holding back or throwing off any bundle that is not properly placed on the carrier or is put on top of another bundle thereon, thus rendering it impossible to clog the band-cutter and feeder. The feed-limiting mechanism comprises the parallel bars 50, pivotally supported on the end of the shaft 30 and connected by rods 51 and 52 and by a multiple crank-shaft 53, that is mounted in bearings preferably at the outer end of said bars. To permit the vertical adjustment of the bars 50 and the mechanism carried thereby, I prefer to provide the curved rack-bars 54 on the rod 51, the teeth of said bars engaging pinions 55, provided on a shaft 56 on the top of the feeder-casing. A dog 57, engaging the teeth of the pinion, locks the bars 50 in any desired position. As shown in Fig. 1, the end of the shaft 56 is preferably square to receive the crank by means of which the shaft may be revolved and the feed-limiting mechanism adjusted. Upon the crank-shaft 53 a series of bars or kickers 57 are pivotally arranged connected at their upper ends to a shaft 58 by pivoted links 59, said shaft being supported upon levers 60, that are pivoted to the bars 50 and connected with the feeder-casing by pivoted links 61. The kickers have a downward and forward movement toward the receiving end of the carrier and engage the upper bundles should they be fed in layers two bundles deep and toss or throw them back toward the receiving end of the carrier, and thus prevent the bundles from being fed into the machine too rapidly and clogging the band-cutting and feeding mechanism. The limiting mechanism can be readily adjusted according to the size of the bundles that are fed into the machine, and while permitting two bundles side by side or a single layer of bundles to pass into the machine will stop and throw back any bundles that may by accident or design be placed upon the carrier and which would tend to clog the band-cutting and feeding mechanism.

The crank-shaft 53 may be driven in any suitable manner; but I prefer to operate it by a chain 62, passing over sprockets provided on the shaft 30 and said crank-shaft.

In various ways my improved band-cutting and feeding mechanism may be modified by any one skilled in the art, and I do not, therefore, wish to be confined to the details of construction herein set forth.

Having thus described my invention, I claim as new and desire to secure by Letters Patent—

1. In a band-cutter and feeder, the combination, with a cylinder and feed-board, of a bundle-carrier, rotary means disposed between said feed-board and carrier for cutting the bundle-bands and spreading the grain, an unobstructed space being provided between said cylinder and the band-cutters, a series of rapidly-revolving pickers mounted above the discharge end of said carrier and at a sufficient distance therefrom to allow the bundles lying flatwise to pass through without being engaged by said pickers and said pickers being adapted to engage bundles delivered on end from said carrier and level and direct them toward said band-cutting means, a second series of revolving pickers located over said band-cutting means and operating at a slower speed and adapted to yield vertically under pressure of the grain and to engage the tops of the bundles after the bands are cut and temporarily hold the same while the lower portions of the bundles are advanced toward the cylinder by the band-cutting means, substantially as described.

2. In a band-cutter and feeder, the combination, with the cylinder and feed-board, of the bundle-carrier, rotary means disposed or arranged between said feed-board and carrier for cutting the bundle-bands and spreading the grain an unobstructed space being provided between said cylinder and band-cutters, a frame or shoe arranged above said band-cutting means and pivotally supported near its outer end and adapted to swing vertically under pressure of the grain, a series of rapidly-revolving pickers mounted in said shoe above the discharge end of said carrier and at a sufficient distance therefrom to allow the bundles lying flatwise to pass through without being engaged by said pickers and said pickers being adapted to engage bundles delivered on end from said carrier and level and direct them toward said band-cutting means, a second series of revolving pickers also mounted in said shoe and located over said band-cutting means and operating at a slower speed adapted to engage the tops of the bundles after the bands are cut and temporarily hold the same while the lower portions of the bundles are advanced toward the cylinder by said band-cutting means, substantially as described.

3. In a band-cutter and feeder, the combination, with a cylinder and feed-board, of a floor or plate located above said board and inclined toward the same and said cylinder, a series of rotary band-cutters operating through said floor and adapted to cut the bands and advance the lower portions of the bundles down the incline toward said cylinder, a bundle-carrier for delivering the bundles of grain to said floor in position to be engaged by said band-cutters, a shaft 24 mounted over the discharge end of said carrier, a shoe pivoted thereon, a series of rapidly-revolving pickers mounted on said shaft and operating through said shoe to engage and level the standing bundles delivered by said carrier, a shaft 26 mounted in said shoe over said band-cutters and having a limited vertical movement with said shoe, a series of pickers mounted on said shaft 26 and operating through said shoe at a slower speed than said first-named wheels and said band-cutters and adapted to engage without compressing the tops of the bundles of grain and temporarily hold back the same while their lower portions are fed forward to the cylinder by said band-cutters, substantially as described.

4. In a band-cutter and feeder, the combination, with a cylinder and feed-board, of a floor or plate above said feed-board, a series of rotary band-cutters operating through said floor, an unobstructed space being provided between said cylinder and band-cutters, a bundle-carrier adapted to deliver bundles of grain upon said floor in position to be engaged by said band-cutters, a shaft 24 mounted above the discharge end of said carrier, a shoe 23 mounted on said shaft and having a swinging vertical movement thereon, a stop supporting the free end of said shoe, a shaft 26 mounted in said shoe near its free end over said band-cutters and projecting through a slot in said casing and wherein said shaft has a limited vertical movement with said shoe, a series of revolving pickers mounted on said shaft 26 and operating at a slower speed than said band-cutters and adapted to engage the tops of the bundles of grain and hold back the same while the lower portions are fed forward into said unobstructed space toward said cylinder by said band-cutters, substantially as described.

5. In a band-cutter and feeder, the combination, with the feed-board and cylinder, of a plate inclined toward said cylinder and located above said feed-board, an unobstructed space being provided between said cylinder and shoe, a series of band-cutters operating through said floor, a bundle-carrier for delivering the bundles of grain to said floor in position to be engaged by said band-cutters, feed-limiting devices overhanging the discharge end of said carrier and adapted to engage the overplus bundles and throw them toward the receiving end of the same, a slatted frame or shoe pivoted above said carrier and having a vertical swinging movement on its pivots, the free end of said shoe being over said band-cutters, and a series of pickers mounted in said shoe and movable therewith and revolving at a slower speed than said band-cutters and adapted to engage and hold the tops of the bundles while the lower portions thereof are fed down said plate into said unobstructed space toward the cylinder by said band-cutters, substantially as described.

6. In a band-cutter and feeder, the combination, with a reciprocating plate having a series of longitudinal slots, of a band-cutting and feeding mechanism operating above the same through said slots to cut the bundle-bands and spread the grain, a bundle-carrier adapted to deliver the bundles of grain upon said plate in position to be engaged by said band-cutting and feeding mechanism the loose grain being caught up by said plate, a second plate provided beneath said first-named plate to receive the loose grain falling through said slots, and means for reciprocating said plates simultaneously, substantially as described.

7. In a band-cutter and feeder, the combination, with a pivoted reciprocating plate having a toothed or corrugated surface and provided with a series of longitudinal slots, of a rotary band-cutting and feeding mechanism operating above said plate through said slots, a bundle-carrier adapted to deliver the bundles of grain to said feed mechanism, the loose grain falling upon said plate, a second toothed or corrugated plate arranged beneath said first-named plate to receive the kernels of grain therefrom, and means for reciprocating said plate in the same direction alternately, substantially as described.

8. In a band-cutter and feeder, the combination, with an arched swinging plate having a corrugated surface and provided with a series of longitudinal slots, of a rotary band-cutting and feeding mechanism operating above said plate through said slots, a bundle-carrier to deliver the bundles of grain to said feed mechanism, the loose grain falling upon said plate, a second corrugated plate provided beneath said first-named plate, pivoted levers having their ends pivotally connected, respectively, to said plates, and means for operating said levers to reciprocate said plates in the same direction alternately, substantially as described.

9. In a band-cutter and feeder, the combination, with a cylinder and feed-board, of a plate located above said board and inclined toward the same, links whereon the inner end of said plate is pivotally supported, a series of band-cutters and feeders operating through longitudinal slots in said plate and adapted to cut the bands of bundles deposited thereon, the loose seeds falling on said plate, a crank-shaft provided near the receiving end of said plate, a pitman rod or link connecting said crank-shaft and said plate, whereby a swinging reciprocating movement is imparted to the latter to advance the seeds and fine material thereon toward said cylinder, and a second reciprocating plate provided beneath said first-named plate to receive the seeds and fine material falling through the slots therein, substantially as described.

10. In a band-cutter and feeder, the combination, with a reciprocating plate having a corrugated surface and provided with a series of longitudinal slots, of a rotary band-cutting and feeding mechanism operating above said plate through said slots, a bundle-carrier adapted to deliver the bundles of grain to said feed mechanism, the loose grain falling upon said plate, a second corrugated plate arranged beneath said first-named plate to receive the loose grain falling through said slots, lever pivotally connected to said plates and pivotally supported at points intermediate thereto, a crank-shaft and pitman links or rods connecting said crank-shaft with said levers, whereby said plates will be reciprocated in the same direction alternately, substantially as described.

In witness whereof I have hereunto set my hand this 14th day of March, 1900.

AUGUST J. HEINE.

In presence of—
EUGENE RHULER,
S. H. SNYDER,